United States Patent [19]

Steinmetz et al.

[11] 4,426,865
[45] Jan. 24, 1984

[54] APPARATUS FOR LUBRICATING TOOLS ON METAL EXTRUSION PRESSES

[75] Inventors: Alfred Steinmetz, Schiefbahn; Klaus Exner; Dieter Welters, both of Dusseldorf, all of Fed. Rep. of Germany

[73] Assignee: SMS Schloemann-Siemag Aktiengesellschaft, Dusseldorf, Fed. Rep. of Germany

[21] Appl. No.: 311,170

[22] Filed: Oct. 14, 1981

[30] Foreign Application Priority Data

Oct. 30, 1980 [DE] Fed. Rep. of Germany ....... 3040886

[51] Int. Cl.³ ............................................ B21C 23/32
[52] U.S. Cl. ................................................... 72/44
[58] Field of Search ................... 72/41, 42, 43, 44, 45, 72/253, 257, 264, 270

[56] References Cited

U.S. PATENT DOCUMENTS

| 2,538,917 | 1/1951 | Sejournet et al. | 72/42 |
| 2,581,708 | 1/1952 | Rogers et al. | 72/45 |
| 2,988,211 | 6/1961 | Kent et al. | 72/45 |
| 3,015,387 | 1/1962 | Evans | 72/41 |
| 3,072,251 | 1/1963 | Sauve | 72/42 |
| 3,362,205 | 1/1968 | Edgecombe | 72/44 X |
| 3,566,641 | 3/1971 | Sauve | 72/45 X |

FOREIGN PATENT DOCUMENTS 263542 2/1970 U.S.S.R. ..................... 72/45

Primary Examiner—E. Michael Combs
Attorney, Agent, or Firm—Holman & Stern

[57] ABSTRACT

In a metal extrusion press, extrusion tools such as dies, mandrels, and closure members for billet receivers, are lubricated by bringing into contact with these tools, while the tools are hot, candles of lubricant material which melt on contact with the tools. The candles are moved into and out of engagement with the tools by a movable support operating automatically in the press cycle.

9 Claims, 9 Drawing Figures

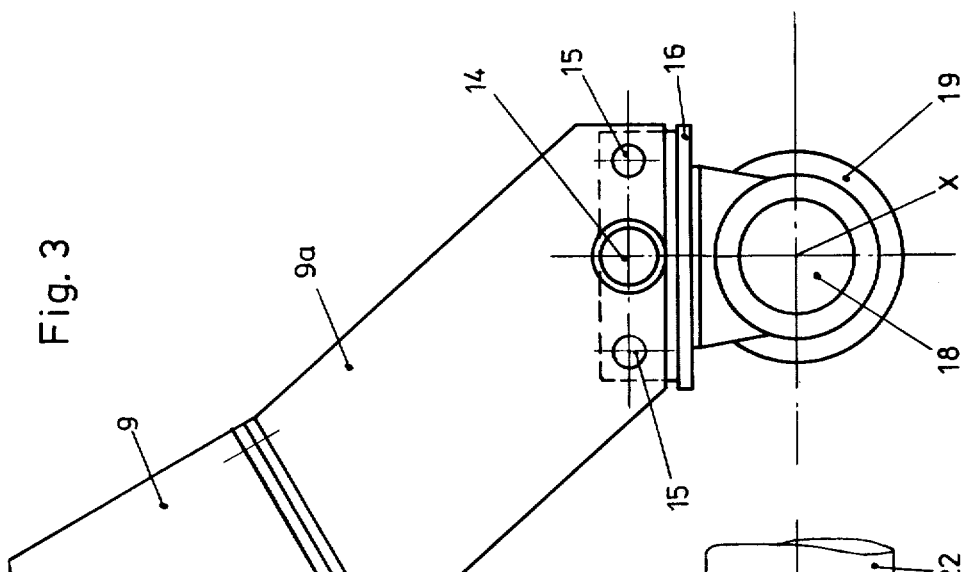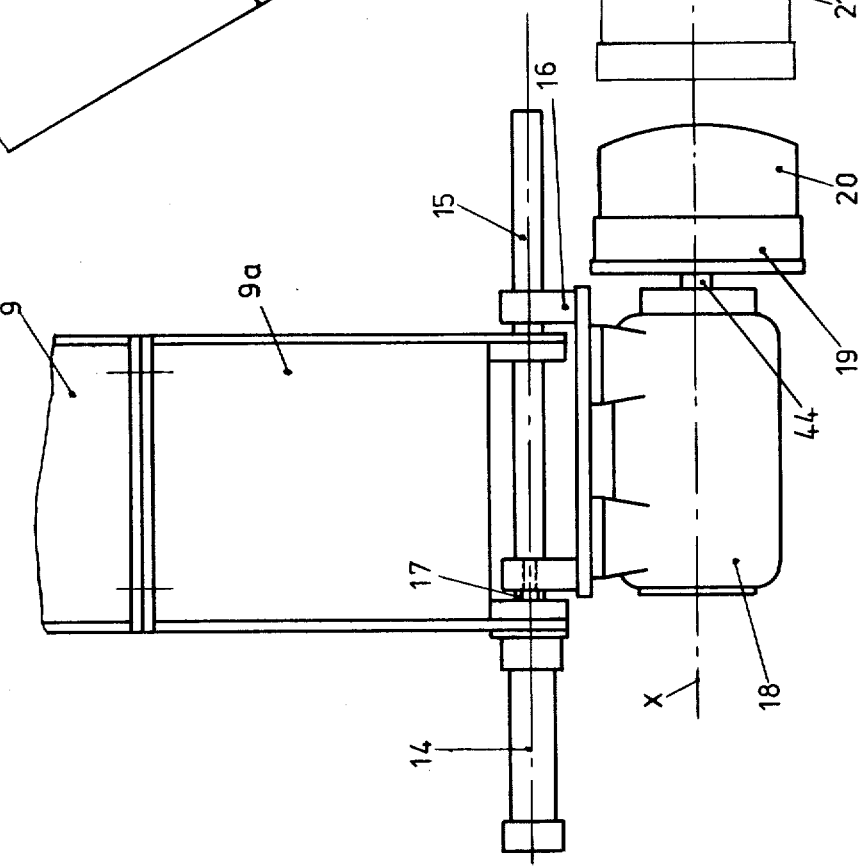

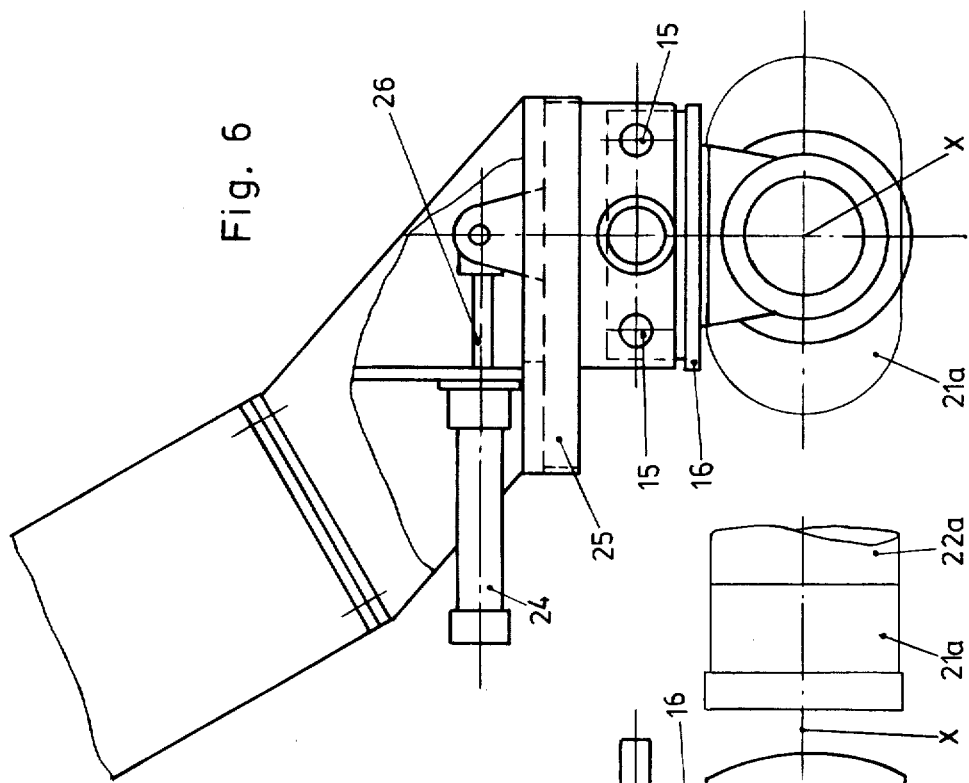
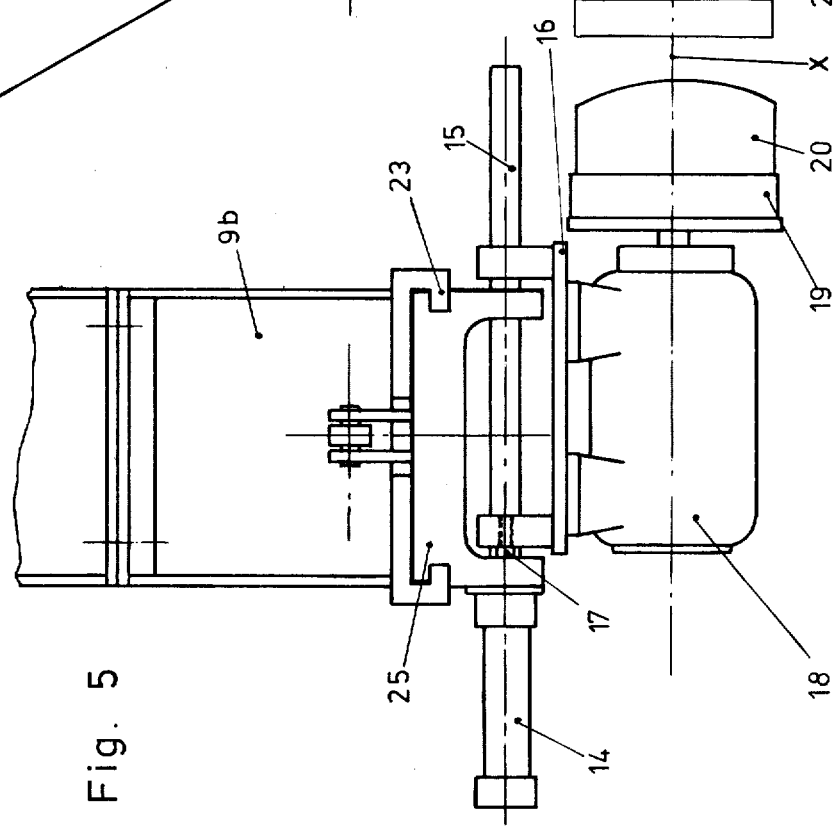

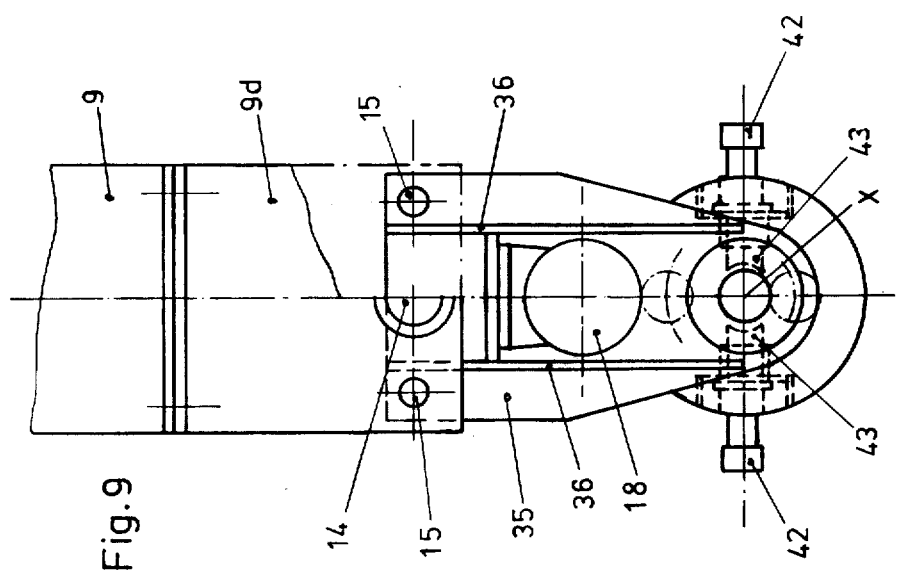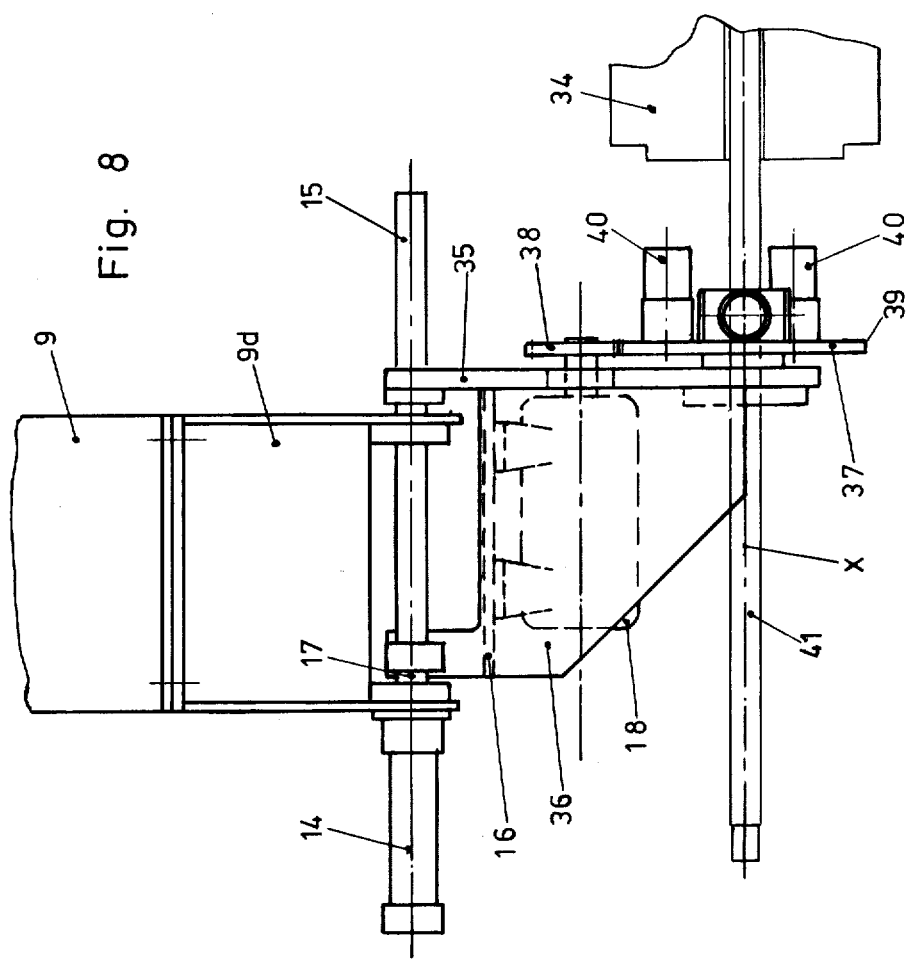

APPARATUS FOR LUBRICATING TOOLS ON METAL EXTRUSION PRESSES

BACKGROUND OF THE INVENTION

1. Field of the Invention

This invention relates to the lubrication of extrusion tools in presses for the extrusion of metal. The invention is applicable to presses for the extrusion of solid or profiled sections and tube-extrusion presses. The press can be of the direct or indirect extrusion type.

2. Description of the Prior Art

At present, the tools, for example extrusion dies and mandrels, of extrusion presses are usually lubricated, by hand, usually with a liquid lubricant for example liquid graphite. With this procedure, the application of lubricant is performed irregularly and the application of a specified amount of lubricant cannot be ensured. Uniform lubrication is particularly difficult when a mandrel has to be lubricated: the person performing this task usually stands on one side of the press and can reach the opposite side of the mandrel only with difficulty. The distribution of lubricant is uneven. The lubricating implement is usually a stick with a cloth which is dipped into the lubricant and then applied by hand to the extrusion tool to be lubricated. The liquid lubricant tends to be splashed about, causing serious contamination of the press and the surroundings. Manual lubrication is also very labour-intensive.

Extrusion presses have also been lubricated by spraying liquid lubricant onto the extrusion tools: this is also a dirty and labour-intensive procedure.

BRIEF SUMMARY OF THE INVENTION

An object of the present invention is to provide for lubrication of the tools of direct or indirect metal extrusion presses in a manner providing uniform lubricant application while reducing or eliminating contamination and labour.

According to the present invention the extrusion tool is lubricated by application of a candle of solid lubricant, which melts in contact with the tool owing to the warmth of the tool arising during operation of the press. As the lubricant is normally solid it causes little or no contamination. The lubricant is applied only to the extrusion tool. Any excess lubricant which drips from the hot tool can be collected easily, and may be reused.

For effecting lubrication in this manner, we provide lubricating apparatus comprising a support arm mounted movably on the press and having a free end movable towards and away from the extrusion axis of the press, and a carrier mounted movably on the free end of the arm and adapted to carry at least one candle of solid heat-meltable lubricant, the disposition being such that in operation an end of the lubricant candle can be brought into engagement with the tool to be lubricated.

With apparatus of this kind it is possible to perform automatic lubrication of the extrusion tool, and the time needed for lubrication can be included in the operating cycle of the extrusion press. Uniform lubrication can thus be ensured.

For lubricating a round extrusion die, or a closure member for the billet receiver of an indirect extrusion press, the lubricant candle is preferably rotatable and of a diameter greater than that of the extrusion die or closure member, and in use is placed along the extrusion axis.

For lubricating a rectangular extrusion die, a rectangular lubricant candle on the extrusion access can be used. Alternatively, a rectangular die can be lubricated by a round lubricant candle which can move not only along the extrusion axis but also transversely.

For lubricating a mandrel, two or more lubricant candles are disposed so as to engage the mandrel radially. Uniform lubrication of the mandrel is ensured by simultaneous rotation and axial movement of the mandrel. Alternatively the lubricant candles can be mounted to rotate about the mandrel. In the case of an indirect tube extrusion press, the lubricant candle carrier is rotatable and carries at least two radial lubricant candles and at least one further lubricant candle movable axially for lubricating the closure member of the billet receiver of the press.

BRIEF DESCRIPTION OF THE DRAWINGS

Several embodiments of apparatus according to the invention will now be described by way of example, with reference to the accompanying drawings, in which:

FIG. 2 is a side elevational view of the free end of a pivotable arm of the tool-lubricating device of FIG. 1, FIG. 3 is an end elevational view of the lubricating device as viewed from the left of FIG. 2, FIG. 5 is a side elevational view of yet another embodiment of a lubricating device in accordance with the invention, FIG. 6 is an end elevational view of the lubricating device as viewed from the left of FIG. 5, with parts broken away, FIG. 8 is a side elevational view of a lubricating device of the invention for lubricating a mandrel and a closure member for a billet receiver, and FIG. 9 is an end elevational view of the lubricating device as viewed from the left of FIG. 8 with parts broken away.

DETAILED DESCRIPTION

Figure 1:
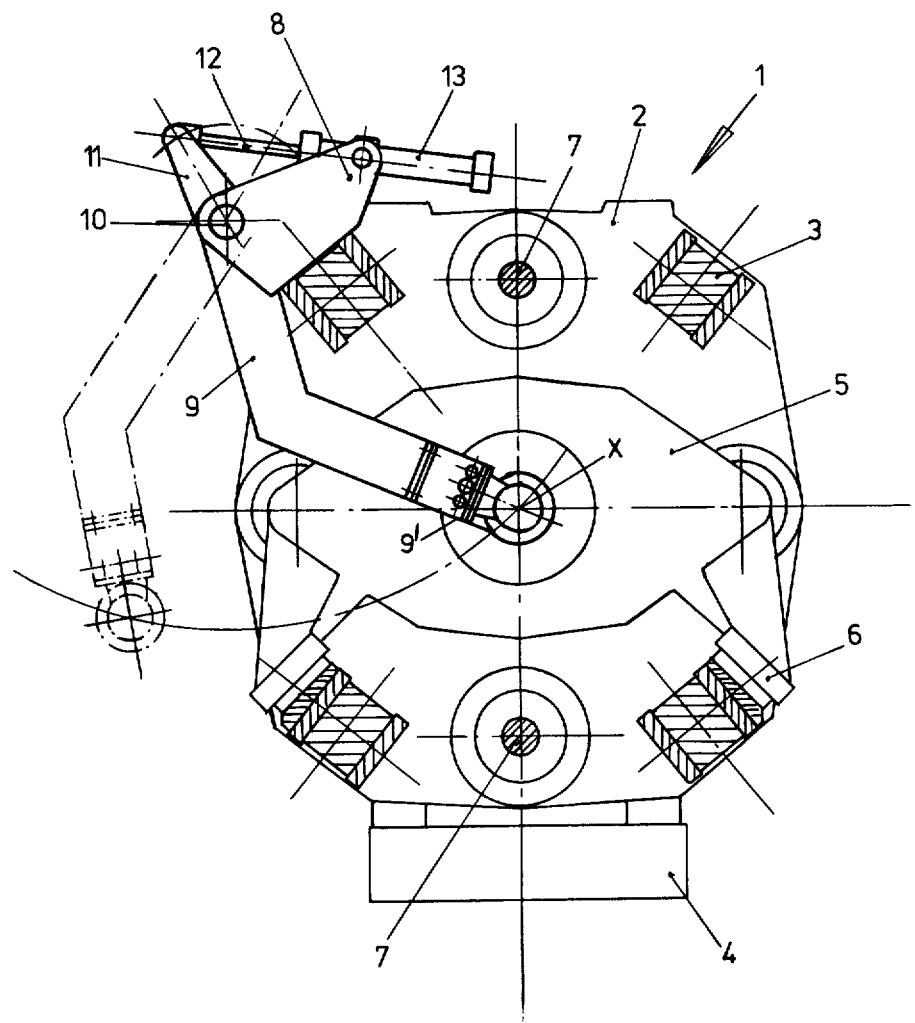
FIG. 1 is a cross-sectional view of a metal extrusion press incorporating a lubricating device in accordance with the invention.

FIG. 1 shows a metal extrusion press 1 comprising a cylinder crosshead 2, a counter-crosshead (not shown), prestressed tie members 3 which interconnect these crossheads to form the press frame, and a movable crosshead 5 which is guided by means of supports 6 on the tie members 3. The press rests on a foundation 4. FIG. 1 also shows sliding bars 7 associated with a billet receiver (not shown). The general arrangement of the press is conventional. Extrusion of the metal billet placed in the billet receiver is effected by movement of the movable crosshead 5 along the press frame. In a direct extrusion press the billet is expelled from the receiver through a stationary extrusion die carried by the counter-crosshead. In an indirect extrusion press, the billet and receiver are moved together over the extrusion die. In either form of press, a mandrel may be provided for extrusion of tubes.

FIG. 1 shows schematically a tool-lubricating device in accordance with the invention, comprising a support arm 9 pivotably mounted by means of a pivot 10 on a support bracket 8 which is mounted on the press frame at a position convenient for the tool or tools to be lubricated. The arm 9 is pivotable in a plane perpendicular to the extrusion axis X of the press. In this way the free end 9' of the support arm can be moved to an operative position on or adjacent to the extrusion axis, or to a retracted position as shown in broken lines. For pivoting the support arm, an upward extension 11 of the arm is articulated to the piston rod 12 of a pneumatic or hydraulic cylinder 13 pivotably mounted on the bracket 8.

At the free end, the support arm 9 has a detachable end portion, so that different lubricating devices can be mounted on the arm according to the requirements of the particular extrusion tool to be lubricated. Various different lubricating arrangements will be described with reference to FIGS. 2 to 9; throughout these, corresponding components will be identified by the same reference numerals.

FIGS. 2 and 3 show a device for lubricating a circular extrusion die 21 mounted on an extrusion ram 22 of an extrusion press, in particular a direct extrusion press. A similar lubricating device can be used in an indirect extrusion press for lubricating a closure member mounted on the movable crosshead of the indirect extrusion press, at the rear of the billet receiver; the closure member locates the metal billet in the receiver during extrusion.

In the lubricating device shown in FIGS. 2 and 3, the detachable bottom part 9a of the support arm 9 carries a hydraulic or pneumatic cylinder 14 parallel to the extrusion axis X, and guide rods 15 parallel to and on opposite sides of the cylinder axis. A carriage 16 is suspended from the rods 15 and can slide along these, and is connected to the piston rod 17 of the cylinder 14.

A geared motor 18 is mounted on the underside of the carriage 16 and has a stub shaft 44 on which is mounted a receptacle 19 for a lubricant candle 20 of circular cross section. In the operating position, the motor 18 and candle 20 are coaxial with the extrusion axis X. The candle is thus rotatable about and movable along the extrusion axis. For lubricating the circular extrusion die 21, or the closure member for a billet receiver, the candle is rotated by the motor 18 and is pressed against the die or closure member by the cylinder 14.

The lubricant candle is made of a solid lubricant composition adapted to melt when brought into contact with the die or closure member: these latter components are hot during operation of the press. The lubricant candle therefore melts when in contact with the die or closure member and transfers lubricant to the latter. Little or no lubricant will reach any other part of the press or its surroundings. The operating movements of the arm 9, cylinder 14 and motor 18 can be controlled automatically and integrated into the normal operating cycle of the extrusion press.

The candle has a diameter greater than the extrusion die or closure member. Accordingly the lubricant candle will lubricate not only the end face of the extrusion die or closure member, but also, as it melts and is pushed axially by the cylinder 14, will lubricate the edge of the extrusion die or closure member.

By the described means, regular automatic lubrication is ensured, with uniform distribution of the lubricant material. Manual attention is substantially eliminated.

Figure 4:
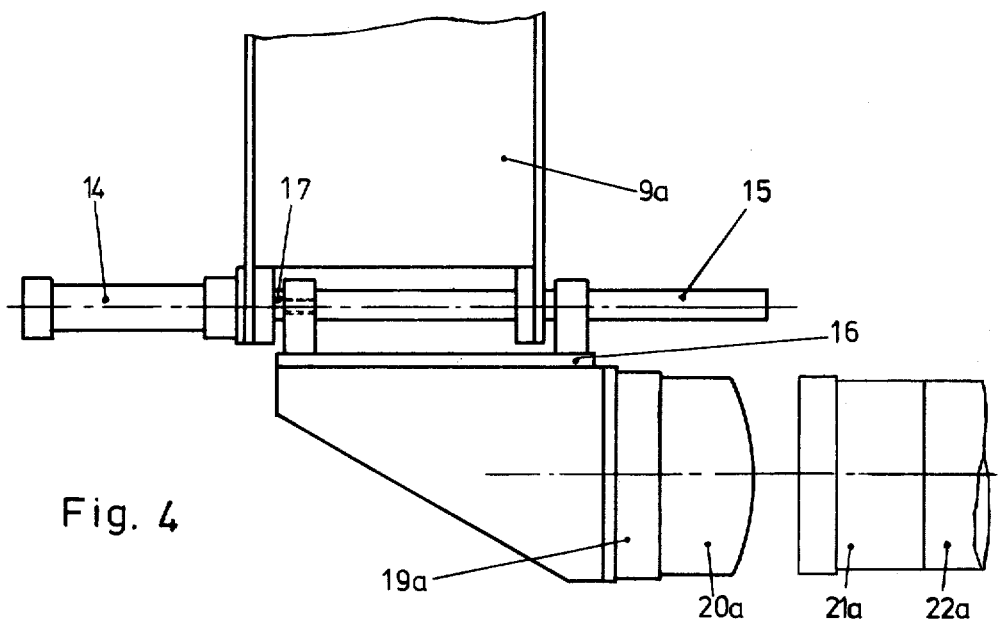
FIG. 4 is a side elevational view, corresponding to FIG. 2, of another embodiment of a lubricating device in accordance with the invention.

FIG. 4 shows an embodiment of the invention for lubricating a rectangular extrusion die 21a mounted on a corresponding extrusion ram 22a. This device differs from that of FIG. 2 in that the rectangular holder 19a for a rectangular lubricant candle 20a is mounted directly on the underside of the carriage 16. Thus the rectangular candle is simply moved axially against the extrusion die 21a. The lubricant candle preferably has greater dimensions than the extrusion die, so as to ensure that the edge of the die is lubricated, as well as its end face.

FIGS. 5 and 6 show an embodiment of the invention for lubricating a rectangular extrusion die 21a using a lubricant candle 20 of circular cross section. In this device, the bottom portion 9b of the support arm 9 has rectilinear guides 23 perpendicular to a plane passing through and coincident with the extrusion axis X. These guides support and guide a slide 25 which carries a drive cylinder 14 and guide rods 15 as in the embodiment shown in FIGS. 2 and 3. The slide 25 can be moved at right angles to the plane coincident with the extrusion axis by means of the piston rod 26 of a hydraulic or pneumatic cylinder 24 mounted in the arm portion 9b.

In operation, the circular lubricant candle 20 is rotated by the motor 18 and moved along the extrusion axis by the cylinder 14, as in FIGS. 2 and 3. The cylinder 24 reciprocates the slide 25 and the candle carried thereon is correspondingly reciprocated across the extrusion axis, so that the rotating lubricant candle lubricates the rectangular extrusion die over its entire extent.

Figure 7:
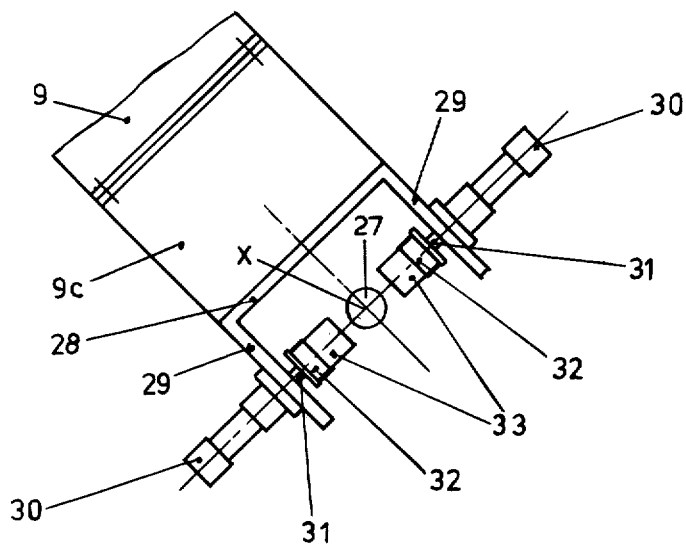
FIG. 7 is an end view of yet another embodiment of a lubricating device of the invention for lubricating a mandrel.

FIG. 7 illustrates an embodiment of the invention for lubricating a mandrel 27 which can be projected from the press ram of a directly operating tube extrusion press. The detachable lower end part 9c of the support arm 9 is forked and is open towards the extrusion axis X. In the illustrated embodiment the arm has a U-shaped or channel-section part 28. The side limbs 29 of this are spaced on opposite sides of the extrusion axis and carry respective hydraulic or pneumatic cylinders 30 oriented radially towards the extrusion axis, when the support arm 9 is in the operating position. Each of these cylinders has a piston rod 31 carrying a receptacle 32 for a lubricant candle 33. The end faces of the lubricant candles face opposite sides of the mandrel 27 and by operation of the cylinders 30 can be pressed against the mandrel. Since the mandrel moves axially along and rotates about the extrusion axis, the lubricant candles pressed against it lubricate it uniformly.

FIGS. 8 and 9 show an embodiment of the invention used in an indirect extrusion press, for lubricating a tubeforming mandrel 41 of the press, and the closure member 34 for closing the rear end of the billet receiver of the press. The end part 9d of the support arm 9 carries a pneumatic or hydraulic cylinder 14 with a piston rod 17 and guide rods 15, generally similar to those shown in FIGS. 2 and 3. A carriage 16, suspended from the rods 15 and connected to the piston rod 17, carries a geared electric motor 18 on its underside. The carriage 16 has depending parallel side plates 36 on opposite sides, and a transverse end plate 35 at the end adjacent to the closure member 34 of the press. The side plates 36 act to stiffen the end plate 35 and the motor 18 is placed between them. The motor shaft carries a pinion 38. The end plate 35 carries a lubricant support 37 rotatable about an axis parallel to that of the motor 18 and provided with a toothed rim 39 in mesh with the motor pinion 38 so that the motor rotates the lubricant support 37. In the illustrated operating position, the axis of rotation of the lubricant support 37 coincides with the extrusion axis X of the press and therefore with the axis of the mandrel 41.

The lubricant support 37 carries a first pair of lubricant candles 40 parallel to the extrusion axis and with their exposed ends facing the end face of the closure member 34. The candles 40 are at different radii from the axis of rotation, so that in operation they sweep over different zones of the end face of the closure member 34, to ensure that the latter is completely lubricated.

The lubricant support 37 also carries a second pair of oppositely disposed lubricant candles 43, mounted radially relative to the axis of rotation of the lubricant support and therefore of the extrusion axis. Each candle 43 is mounted in a receptacle movable radially by a respective pneumatic or hydraulic cylinder 42 so that these candles can be pressed against opposite sides of the mandrel 41.

To lubricate the mandrel, the mandrel is fed axially out of the closure member 34 after the arm 9 has been pivoted into its operating position. The annular lubricant support 37 is rotated with the candles 43 in contact with the axially moving mandrel. For lubricating the end face of the closure member 34, the candles 40 are pressed against this end face by means of the cylinder 14, and are rotated by means of the motor 18. The mandrel and closure member can be lubricated simultaneously, or one after the other.

To ensure complete lubrication of the end face of the closure member, the radially outer candle 40 is so placed that its profile extends radially outside the end face of the closure member.

Although two axial lubricating candles 40 disposed eccentrically at different radii on the annular support 37 have been described, a single axial candle of suitable dimensions and placing to lubricate the closure member, or a multiplicity of axial candles, can be used.

In all of the described embodiments, the operation of the support arm 9 and the driving means provided for the lubricating candles and other elements required to move during lubrication, can be effected automatically as an integral part of the operating cycle of the extrusion press.

The lubricating candles may be made of any suitable meltable lubricating composition, for example a mineral wax composition incorporating graphite.

It is to be understood that the embodiments described with reference to the drawings are given by way of example only, and numerous modifications are possible within the scope of the invention. For example, although the described embodiments use pivotable support arms to carry the lubricating candles, the candles may alternatively be mounted on a support movable rectilinearly, transversely to the extrusion axis.

We claim:

1. In a metal-extrusion press having at least one extrusion tool defining an extrusion axis, and a press frame for supporting said tool, a lubricating device for lubricating said at least one tool, comprising a support arm having a free end, means for mounting said support arm on said press so that said free end is movable towards and away from said extrusion axis, means to operate said support arm, a carrier, means to mount said carrier slidably on said support arm free end for movement parallel to said extrusion axis, a receptacle for at least one candle of solid heat-meltable lubricant, means to support said receptacle on said carrier, means to support said at least one candle on said receptacle, and means to move said carrier so that in operation an end of said candle is engageable with said extrusion tool for lubricating said tool.

2. A lubricating device for an extrusion press as claimed in claim 1 wherein said tool is a rectangular extrusion die and said receptacle is adapted to receive a rectangular lubricant candle facing said die, said receptacle is disposed coaxial with the extrusion axis when the support arm is moved into the lubricating position, and said means to move said carrier moves said receptacle axially with respect to said die.

3. In a direct extrusion press including a press frame, a press ram mounted on said frame, and an extrusion die mounted on said ram defining an extrusion axis, a lubricating device as claimed in claim 1 and further comprising a motor, means to mount said motor on said carrier, means to mount said receptacle on said carrier to be rotatably driven by said motor with its axis of rotation disposed to coincide with the extrusion axis when the support arm is moved into the lubricating position, means to move said carrier so that said receptacle is moved axially with respect to said extrusion die to engage said lubricant candle with said die, said receptacle being adapted to receive a lubricant candle having a diameter greater than that of the extrusion die.

4. A lubricating device as claimed in claim 3 and further comprising means for mounting said carrier on said free end of the support arm for movement perpendicular to said parallel movement of the carrier and means for moving said carrier in said perpendicular direction.

5. A lubricating device as claimed in claim 4 wherein said means for mounting said carrier for said perpendicular movement comprises guides mounted on the free end of the support arm extending in said perpendicular direction, a slide member cooperatively engages said guides for movement along said guides, driving means for moving said slide, and said carrier is mounted on said slide for movement relative thereto parallel to the extrusion axis.

6. In a direct extrusion press including an extrusion ram defining an extrusion axis and a mandrel which can be projected therefrom coaxially with the extrusion axis and is axially and rotatably movable, a lubricating device for lubricating said mandrel comprising a support arm having a free end, means for mounting said support arm on said press so that said free end is movable towards and away from said extrusion axis, means to operate said support arm, a forked member having spaced limbs mounted on said free end of the support arm so that the spaced limbs are disposed on opposite sides of said extrusion axis when said free end is in the lubricating position, at least two lubricating candle support members mounted on said limbs for substantially radial movement with respect to said mandrel, lubricating candles mounted in said candle support members, and means mounted on said limbs for moving said support members so that said candles are movable into and out of engagement with said mandrel.

7. In an extrusion press including a mandrel, a billet receiver, and a closure member for the billet receiver, a lubricating device as claimed in claim 3 wherein said means to mount said receptacle on said carrier comprises a support member rotatably mounted on said carrier at least two further receptacles for lubricant candles mounted on said support members for radial movement relative to said extrusion axis, lubricant candles mounted in said further receptacles, and means mounted on said support member for moving said receptacles radially with respect to said extrusion axis for lubricating the mandrel.

8. A lubricating device as claimed in claim 7 wherein said supported member comprises an annular support rotatable about said extrusion axis, and said at least one axial lubricating candle receptacle is mounted eccentrically on said support member facing said closure member for lubricating the closure member end face by axial movement and rotation of said at least one axial candle.

9. In an indirect extrusion press including a press frame, a movable crosshead mounted on said frame, a closure member mounted on said crosshead for closing a billet receiver of the press, and at least one extrusion tool supported on said frame and defining an extrusion axis, a lubricating device comprising a support arm having a free end thereon, means to movably mount said support arm on said press so that said free end is movable towards and away from said extrusion axis, a carrier, means to mount said carrier slidably on said free end at said support arm for movement parallel to the extrusion axis, a motor, means to mount said motor on said carrier, a rotatable receptacle for an axially disposed lubricant candle, means to mount said receptacle rotatably on said carrier, with its axis of rotation disposed to coincide with the extrusion axis when the support arm is moved into the lubricating position, means to connect said receptacle to said motor to be rotatably driven thereby, at least one lubricant candle mounted on said receptacle, means to move said carrier so that said receptacle is moved axially with respect to said closure member to engage said lubricant candle with said closure, said receptacle being adapted to receive said at least one lubricant candle so that the closure member is completely lubricated as the receptacle rotates.

* * * * *